United States Patent [19]

Bower et al.

[11] Patent Number: 5,119,676
[45] Date of Patent: Jun. 9, 1992

[54] ULTRASONIC METHOD AND APPARATUS FOR DETERMINING WATER LEVEL IN A CLOSED VESSEL

[75] Inventors: John R. Bower; Thomas Powers; Hubert L. Whaley, all of Lynchburg, Va.

[73] Assignee: The Babcock & Wilcox Company, New Orleans, La.

[21] Appl. No.: 753,516

[22] Filed: Sep. 3, 1991

[51] Int. Cl.⁵ ............................................. G01F 23/28
[52] U.S. Cl. ................................. 73/290 V; 367/908; 181/402; 181/124
[58] Field of Search ..................... 73/290 V; 367/908; 181/402, 124

[56] References Cited

U.S. PATENT DOCUMENTS

| | | | |
|---|---|---|---|
| 2,960,678 | 11/1960 | Beard et al. | 367/908 |
| 3,303,457 | 2/1967 | Akesson | 367/908 |
| 4,090,407 | 5/1978 | Shuler et al. | 73/290 |
| 4,101,865 | 7/1978 | Schurr | 73/290 V |
| 4,193,291 | 3/1980 | Lynnworth | 73/32 A |
| 4,248,087 | 2/1981 | Dennis et al. | 73/290 V |
| 4,300,854 | 11/1981 | Sluys | 405/1 |
| 4,320,659 | 3/1982 | Lynnworth et al. | 73/589 |
| 4,523,465 | 6/1985 | Fasching et al. | 73/290 V |
| 4,571,693 | 2/1986 | Birchak et al. | 364/509 |
| 4,679,430 | 7/1987 | Scott-Kestin et al. | 73/290 V |
| 4,745,293 | 5/1988 | Christensen | 250/577 |
| 4,761,997 | 8/1988 | Reijonen et al. | 73/155 |
| 4,773,254 | 9/1988 | Shen | 73/38 |
| 4,890,490 | 1/1990 | Telford | 73/290 V |
| 4,909,080 | 3/1990 | Kikuta et al. | 73/290 V |
| 4,933,915 | 6/1990 | Boström | 367/908 |
| 4,955,004 | 9/1990 | Viscovich | 367/908 |
| 4,984,449 | 1/1991 | Caldwell et al. | 73/49.2 |
| 5,015,995 | 5/1991 | Holroyd | 367/908 |
| 5,031,451 | 7/1991 | Webster | 73/290 V |

FOREIGN PATENT DOCUMENTS

| | | | |
|---|---|---|---|
| 0042464 | 12/1981 | European Pat. Off. | 73/290 V |
| 3330059 | 2/1985 | Fed. Rep. of Germany | 73/290 V |
| 0818351 | 8/1959 | United Kingdom | 73/290 V |
| 84/01233 | 3/1984 | World Int. Prop. O. | 367/908 |

OTHER PUBLICATIONS

"How Echo-Type Gages Measure Tank Levels," Oil and Gas Journal, vol. 54, No. 39, pp. 275; 278 (Jan. 1956).
Sandeno Technical, Lynnwood, Wash., "ELF (Electronic Level Fluid Measurement System)", (no date).
Technical Proposal (R&D 91-100), Inquiry No. 73-DBS-827541, *Ultrasonic Water Level Detection System*, Proposal submitted to Westinghouse Electric Corp., Bettis Atomic Power Laboratory, Apr. 19, 1991.

Primary Examiner—William A. Cuchlinski, Jr.
Assistant Examiner—Diego F. F. Gutierrez
Attorney, Agent, or Firm—Vytas R. Matas; Robert J. Edwards; Daniel S. Kalka

[57] ABSTRACT

An ultrasonic method and apparatus for measuring liquid level in a vessel employing an acoustic waveguide (16) connected to an ultrasonic transducer (14) and the vessel (18). Guiding means (24) situated inside a vessel (18) directs the acoustic energy pulse to a surface (22) of the liquid. The acoustic energy pulse is reflected from the surface (22) and returned along the guiding means (24) to the acoustic waveguide (16). A pulser/receiver (10) connected thereto measures the reflected acoustic energy pulse for determining liquid level from the transit time.

10 Claims, 1 Drawing Sheet

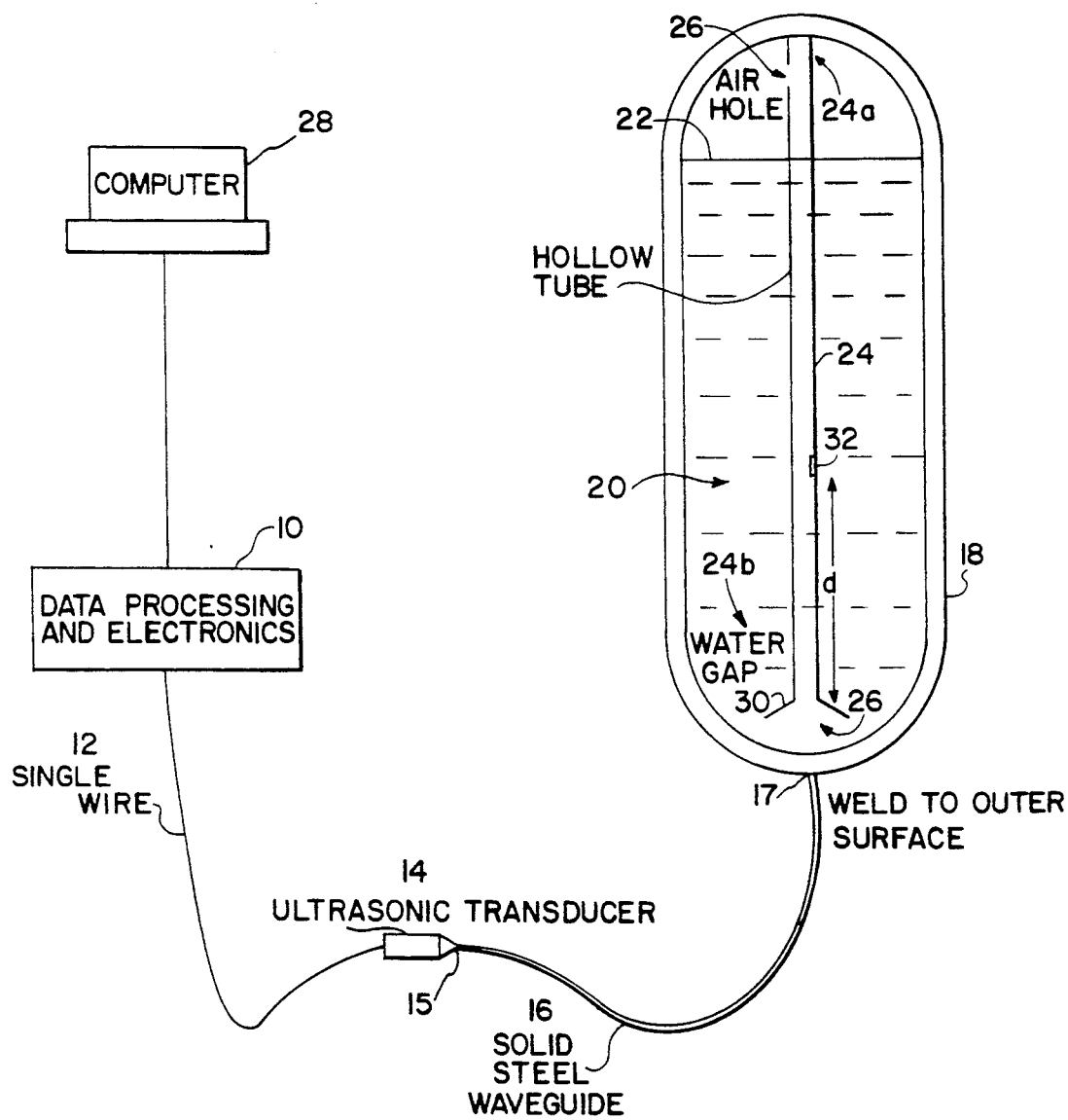

ULTRASONIC METHOD AND APPARATUS FOR DETERMINING WATER LEVEL IN A CLOSED VESSEL

BACKGROUND OF THE INVENTION

1. Field of the Invention

The present invention relates in general to measuring a liquid level in a vessel, and in particular, to an acoustic method and apparatus for measuring water level in a closed vessel such as a pressure vessel.

2. Description of the Related Art

Liquid levels in vessels have been determined from sight glasses in which the liquid is observed visually. Levels are also determined by measuring the difference in pressure between the top and bottom liquid/gas layers of the vessel. These methods ordinarily require at least two penetrations into a vessel wall. Ideally, a water level detection system for a vessel subjected to high temperatures and pressures should have no vessel penetrations and there should be no active components inside the vessel due to the potential failure of these mechanisms.

It is known to use ultrasound for measuring the depth of a liquid or a dry solid such as grain. Sound travels through the liquid, or through the air space above the liquid or solid. In these cases, this normally requires a transducer situated inside the vessel or container.

Other methods have been proposed, but they all use at least one penetration of the wall and subject the sensors to high temperatures and pressures.

There exists an electronic level fluid measurement system that uses ultrasonic sensors epoxied externally to a bottom of a tank. This system measures liquid level up through the tank bottom, "bouncing" signals off of the liquid/air barrier and then computing volume from signal rebound time. It is available from Sandeno Technical, 20016 Cedar Valley Road, Lynnwood, WA 98036.

A disadvantage with this system is that heat affects ultrasonic sensors. If there are any internal structures or tilting, it can prevent proper operation.

Thus, there is a need for a liquid level detection system suitable for monitoring liquid levels of vessels subjected to high pressures and temperatures. The liquid level detection system should not penetrate any vessel walls and the active components should be remotely located from the vessel.

SUMMARY OF THE INVENTION

The present invention solves the aforementioned problems with the prior art as well as others by providing an ultrasonic apparatus and method for measuring liquid level of a vessel subjected to high pressures and temperatures without exposing any sensitive electrical equipment to the hostile environment.

The present invention provides an acoustic waveguide attached at a predetermined location to a wall of the vessel. An ultrasonic transducer is connected to the waveguide at a remote location from the vessel and directs an acoustic energy pulse along the acoustic waveguide. The acoustic waveguide couples the acoustic energy pulse through the vessel wall into the vessel. A guide tube situated inside the vessel guides the acoustic energy pulse to the liquid-gas boundary of the liquid where the acoustic energy pulse is reflected, returned, and guided by the guide tube to outside the vessel. The signal is measured by an ultrasonic pulser/receiver connected to the acoustic waveguide through the transducer. The signal arrival times are then translated into the actual liquid level depth by computation of the pulse travel time.

One object of the present invention is directed to an ultrasonic apparatus for acoustically measuring liquid level in a vessel in a hostile environment.

Another object of the present invention is directed to a method for acoustically measuring liquid level in a vessel in a hostile environment.

Still another object of the present invention is directed to a water level detection system for use in a high temperature pressure vessel without any vessel penetration or sensitive equipment exposed to the temperature and pressure extremes.

Yet a further object of the present invention is to provide a water level detection system that is simple in design, rugged in construction, and economical to manufacture. The system does not penetrate the pressure vessel. It does not subject any active components to high temperature or pressure. It merely requires a single cable operation with minimal system calibration to provide prolonged service life and a high degree of accuracy.

The various features of novelty characterized in the present invention are pointed out with particularity in the claims annexed to and forming a part of this disclosure. For a better understanding of the invention, the operating advantages attained by its uses, reference is made to the accompanying drawing and descriptive matter in which a preferred embodiment of the present invention is illustrated.

BRIEF DESCRIPTION OF THE DRAWING

In the drawing:

FIG. 1 is a sectional view of a schematic illustration of the present invention in position in a high temperature pressure vessel.

DESCRIPTION OF THE PREFERRED EMBODIMENT

Referring to the single FIGURE, there is depicted an ultrasonic apparatus for measuring liquid level in a vessel subjected to high pressure and high temperature. An ultrasonic pulser-receiver (10) with associated data processing electronics is connected with a coaxial cable (12) to an ultrasonic transducer (14) mounted on one end (15) of an acoustic waveguide (16). The transducer may be piezoelectric, magnetostrictive, or any other type capable of producing and detecting ultrasonic waves. A piezoelectric transducer may be mounted on a waveguide with epoxy, or spring loaded or clamped with ultrasonic couplant such as silicone grease. The other end (17) of the acoustic waveguide (16) is attached with welding or other suitable means to the bottom wall of a vessel (18). While vessel (18) in FIG. 1 is a closed vessel, the present invention is readily employable in any vessel for determining liquid level. Vessel (18) may be a reactor or a boiler employed in a known manner in an industrial technique where it is subjected to high temperatures and/or pressures. Preferably, the acoustic waveguide (16) is attached by welding to the center bottom of the vessel (18). The ultrasonic transducer (14) is attached to the waveguide (16) at a predetermined distance away from the pressure vessel (18) so that it is not exposed to the high temperatures or pressures on or around the vessel (18). Inside vessel (18) there is a liquid (20), water for the example depicted in the FIGURE, having a liquid-gas boundary (22) that is employed for measurement. Of course, any liquid, not just water, is measurable with the present invention.

A guiding means (24) such as a tube is positioned within vessel (18) and is axially aligned with the end (17) of the acoustic waveguide (16) that is attached to the center bottom of the vessel (18). Tube (24) has a plurality of openings (26) at the top (24a) and bottom (24b) so that the water level inside the tube (24) is the same as outside the tube (24).

The headspace, which is the area above the liquid in the vessel, may contain air or any gas which may be identical to or different from the liquid being monitored.

The length of the acoustic waveguide (16) is determined from the available space, the need to avoid high temperatures, and convenience of installation and maintenance. The acoustic waveguide (16) couples an acoustic energy pulse (sound pulse) to and from the hostile environment. Typically, the acoustic waveguide (16) is manufactured from a steel rod several feet long, preferably about 0.25 inch diameter. The acoustic waveguide (16) may be bent around corners depending upon the application. Ceramic rods may be used for the acoustic waveguide (16) for thermal or electrical insulation.

As stated earlier, the center bottom of vessel (18) is a preferred attachment point since the water height is independent of any tilt or slant of the vessel. However, with knowledge of the interior geometry and any angles, computer processing with computer or microprocessor (28) easily corrects for any placement of the vessel, angle, or tilt.

The guide tube (24) inside vessel (18) is preferably solid wall as sound tends to leak out of the holes (26) used to let the water level adjust inside the guide tube (24). Preferably, guide tube (24) is not directly welded to the wall opposite the waveguide since that causes sound coupling to the wall of the tube (24) instead of to the water inside the tube (24). A funnel or conical shape (30) at the lower end (24b) of guide tube (24) is preferred and may be attached at several points to provide a water gap around most of its circumference. The tube (24) may be welded in place, or supported by guide bars or support plates within the vessel.

The diameter of guide tube (24) is directly related to the frequency of the sound employed. Lower frequencies require a larger tube (24) diameter, while higher frequencies will be attenuated more quickly. In this context, low frequencies are 10-20 kHz and high frequencies are in the megahertz range (MHz). If the waves are short compared to the tube diameter, the direction of the reflected wave at the water surface will depend on the tilt angle, and the reflected wave may be lost through scattering with the walls of the tube (24). If the wavelength is comparable to the tube diameter, the waves are strongly guided by the tube (24) and reflect with little loss at a tilted interface (22). As a reference point, the wavelength in water at 20 kHz is about 75 millimeters (mm), which is three inches. The present invention advantageously guides the energy pulse to avoid random reflections from the walls, other structures, bubbles, and an agitated and/or arbitrarily tilted surface.

In operation, the pulser/receiver (10) in conjunction with ultrasonic transducer (14) directs an energy pulse sound wave which may either be an impulse or a tone burst along acoustic waveguide (16). Ordinarily, an impulse is most often employed since timing the return is easier. While the tone burst gives more total energy, it is more complex to get accurate timing. The acoustic waveguide (16) couples the acoustic energy pulse through the wall of vessel (18) directly into the vessel so that the sound passes through the vessel wall into the liquid inside the tube (24). The sound or energy pulse follows the tube (24) to its liquid-gas boundary or surface and reflects back to the wall where the acoustic waveguide is attached. The energy pulse passes back through the wall and along the waveguide back to the receiver where it is measured.

The liquid level accuracy is determined by timing accuracy and sound velocity accuracy. The timing starts with the return from the inner surface of the vessel (18) and ends with the return from the liquid-gas boundary. Assuming digitized waveforms with computer analysis by computer (28), the timing accuracy can be a small fraction of a cycle. This gives potential measurements to millimeters. The sound velocity varies with temperature and pressure which can be handled by measuring temperature and pressure and using a calibration curve. The system can also be made self-calibrating by including a small acoustic reflector (32) such as a bend or angle, or insert in the tube a known distance (d) into the tube (24). Depending upon geometry and path lengths, there will be multiple echoes from sound paths through the metal. This is a common problem in ultrasonic testing and can be avoided by selective discrimination of waveguide lengths, etc. When such reflections cannot be avoided, they may be compensated with a human operator or computer selectively choosing the variable water surface echo from the static background. One signal cable (12) is employed. This cable can extend for more than 200 feet long.

Internal pressure and temperature of the vessel are not a problem with the present invention since only the guide tube (24) which is preferably metal is subject to these conditions. An acoustic waveguide (16) up to 25 feet may be employed so that the ultrasonic transducer (14) is remotely situated so as not to be affected by high temperatures or pressures in hostile environments. In this manner, the ultrasonic transducer (14) may be located at a temperature normally employed in the range of standard ultrasonic transducers. Advantageously, the apparatus of the present invention is entirely solid state so shock and vibration does not present any problems. There are no pressure boundary penetrations made with the present invention. Furthermore, guide tube (24) may be made of similar material as the vessel (18) for corrosion protection. As stated earlier, the potential accuracy of the present method and apparatus is of the order of millimeters. With the proper selection of tube (24) size and sound frequency, vessel (18) tilt will not affect measurement accuracy. In addition, guide tube (24) prevents bubbles and minimizes agitation effects. It is known that foam or air reflects sound equally. Any changes in sound velocity with temperature, composition, etc. are easily corrected with an automatic built-in self-calibration with an acoustic reflector positioned at a known distance in tube (24). While external noise is ordinarily not a problem, it may be eliminated by signal averaging. In most applications the guide tube inside vessel (18) will be less than 10 inches in diameter and depending upon the size of vessel (18) it is probably one inch in diameter. For a one inch tube, a broad band transducer covering the range from 50 to 500 KHz is preferred. As an additional advantage, the remote location of the ultrasonic transducer (18) allows for easy repair or modification of the system.

While a specific embodiment of the present invention has been shown and described in detail to illustrate the application and principles of the invention, it will be understood that it is not intended that the present invention be limited hereto and that the invention may be embodied otherwise without departing from such principles.

One such example is to provide the guide tube (24) with predetermined acoustic reflectors at one or more points to provide for a full length calibration.

We claim:

1. An apparatus for acoustically measuring liquid level in a vessel, comprising:
    an acoustic waveguide attached at a predetermined location to a wall of the vessel;
    transducer means connected to said acoustic waveguide at a predetermined distance from the vessel for directing an acoustic energy pulse along said acoustic waveguide, said acoustic waveguide coupling the acoustic energy pulse through the wall into the vessel;
    a tube situated inside the vessel for guiding the acoustic energy pulse to a surface of the liquid to be measured, said tube including apertures therein for allowing the liquid within said tube to adjust to a similar level as that in the vessel, said tube further including a conical section at one end axially aligned with said acoustic waveguide, the acoustic energy pulse being reflected from the surface of the liquid and returned along said tube; and
    detected means connected to said acoustic waveguide for measuring the reflected acoustic energy pulse to determine liquid level therefrom.

2. An apparatus as recited in claim 1, wherein said transducer means comprises an ultrasonic transducer.

3. An apparatus as recited in claim 1, wherein said acoustic waveguide is attached to a bottom center of the vessel.

4. An apparatus as recited in claim 1, wherein said acoustic waveguide is fabricated from steel.

5. An apparatus as recited in claim 4, wherein said acoustic waveguide is about 0.25 inch diameter.

6. An apparatus as recited in claim 1, wherein said tube has a diameter proportional to a wavelength of the energy pulse.

7. An apparatus as recited in claim 1, wherein said tube contains at least one acoustical reflector for calibration.

8. A method for acoustically measuring liquid level in a vessel, comprising the steps of:
    attaching an acoustic waveguide to a wall of a vessel;
    directing an acoustic energy pulse along the acoustic waveguide with a transducer connected to the acoustic waveguide and positioned at a predetermined distance from the vessel;
    coupling the acoustic energy pulse with the acoustic waveguide through the wall into the vessel;
    directing the acoustic energy pulse inside the vessel with a tube to guide the acoustic energy pulse to a surface of the liquid;
    providing apertures in the tube for allowing the liquid within the tube to adjust to a similar level as that in the vessel;
    aligning axially a conical section at one end of the tube with the attached acoustic waveguide;
    reflecting the acoustic energy pulse from the surface of the liquid, the reflected pulse returning along the tube; and
    measuring the reflected acoustic energy pulse for determining liquid level in the vessel.

9. A method as recited in claim 8, further comprising the step of adjusting the frequency of the acoustic energy pulse to produce a wavelength proportional to a diameter of the tube.

10. A method as recited in claim 8, further comprising the step of calibrating the method with at least one acoustical reflector situated within said tube.

* * * * *